March 17, 1931.  J. V. ROBINSON  1,797,168
AUTOMATIC TRAIN PIPE CONNECTER
Original Filed Dec. 2, 1919   2 Sheets-Sheet 1

Inventor
Joseph V. Robinson
By his Attorneys
Foster, Freeman, Watson & Coit

Patented Mar. 17, 1931

1,797,168

UNITED STATES PATENT OFFICE

JOSEPH V. ROBINSON, OF NEW YORK, N. Y.

AUTOMATIC TRAIN-PIPE CONNECTER

Application filed December 2, 1919, Serial No. 341,887. Renewed May 18, 1925.

My invention relates to improved supports for automatic train pipe connecters and has among its objects to provide an improved support characterized by simplicity of construction and manufacture, and by the absence of resistance to free universal movement of the connecter head. In the development of automatic means for connecting the train pipes of railway cars, the most stubborn difficulty encountered has been that of maintaining an air-tight joint between the faces of mated connecter heads. In overcoming this difficulty various forms of devices for positively locking the heads together have been resorted to, but to these the objection of complication, unduly high manufacturing costs, and the likelihood of failure in service, apply. The means found most satisfactory and efficient in overcoming this obstacle has been the use of coupling heads having a considerable bearing area, and supported by a universal support which offers the minimum of resistance to universal movement of the connecter head when in the coupled position. The main object of the present invention is to improve this form of support in such wise as to produce a support which will offer practically no resistance to universal movement of mated coupling heads and in which the universal joint of the support may be adjusted longitudinally of the bracket member. With a construction of this character the forces which cause movement between the faces of coupled heads in service are lost at the universal joint, and hence are not permitted to play upon the head. In this manner the full force of the supporting spring is directed to the important function of maintaining an air tight joint between the faces of mated coupling heads, without producing any appreciable resistance to free universal movement of the heads.

My improvement consists in the combinations, arrangements, and constructions hereinafter described, pointed out in the annexed claims, and illustrated in the accompanying drawings, in which Figure 1 is a sectional elevation of my improved support showing a suitable form of coupling head mounted thereon.

Figure 2:
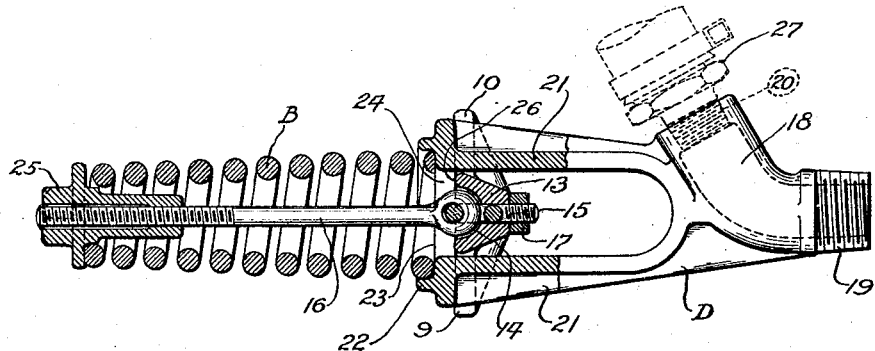
Figure 2 is a longitudinal sectional plane view of my improved support with the coupling head E omitted.
Figure 3:
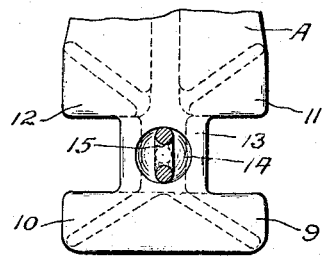
Figure 3 is a rear view of the bracket A with all parts removed except the member which is shown in vertical section.
Figure 4:
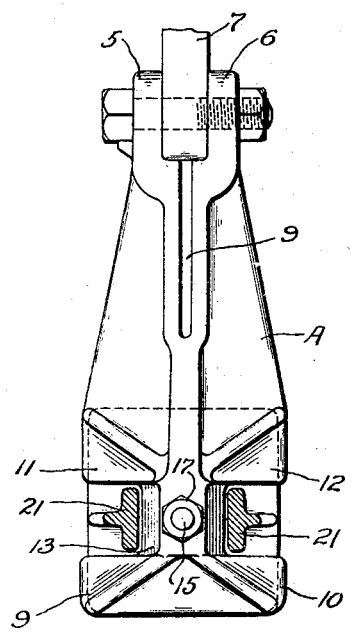
Figure 4 is a sectional front view taken on the line 4—4 of Figure 1.

Referring to the drawings: My improvement comprises a bracket or base A, the upper end of which terminates in spaced ears 5 and 6 which are suitably connected to a lug 7 of the car coupler 8, the bracket being split at 9 to ensure efficient connection between the lug and the bracket. At its lower end the bracket is provided with transversely extending lugs or bosses 9 and 10 which are connected with the overhanging portions 11 and 12 of the bracket by the section 13 which, preferably, is formed integrally with the overhanging portions and said lug. This construction provides a notch or recess at each side of the bracket and gives to the bottom of bracket the outline of an I beam when viewed from the front or the rear. The rear face of the section 13 is hollowed out as shown at 14 to form an opening to receive a universal joint comprising connected members or eye bolts 15 and 16, the mating faces of which are flared in opposite directions and in different planes away from their point of contact. The member 15 of the joint is adjustably mounted in an opening which extends through the section 13 as shown, and is fixed against longitudinal movement relative to the bracket by the nut 17, through the medium of which nut the member 15 may be adjusted to shift the joint axially of the bracket A and to vary the tension of the spring B. To prevent the member 15 from rotating in the bracket, I provide a vertically extending groove in the section 13, into which groove a part of member 15 rests when assembled. This construction is illustrated particularly in Figures 1, 2 and 3.

Figure 1:
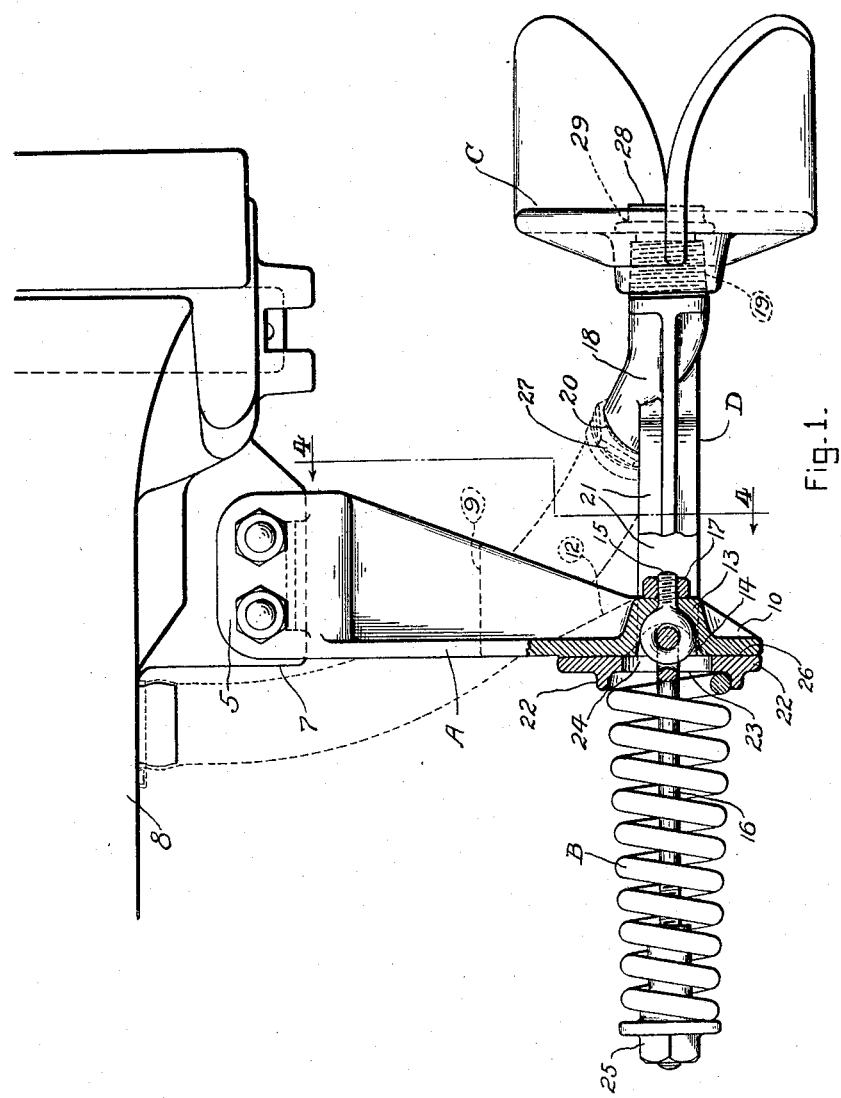

Any suitable form of coupling head C may be used with my improved support. In Figure 1 I illustrate a satisfactory form of such head mounted upon the yoke or body D of my improvement as by thread as shown. The yoke or body member D comprises a laterally diverging fluid conduit 18 which terminates in threaded portions 19 and 20 upon the forward one of which the head C is mounted as shown, though it may be otherwise connected with said conduit if desired. Integrally formed with the conduit, and projecting rearwardly thereof, I provide spaced arms or straps 21, which extend to the rear of the bracket A and between the portions 11 and 12 and the lugs 9 and 10 thereof. The rear ends of the straps are connected by a flange or projection 22, which preferably is formed integrally with said straps or arms and which carries an annular seat 23, and is perforated at 24 to receive the aforesaid universal joint. Upon said seat and surrounding the member or tie rod 16 I mount one end of the buffer spring B, the other end of which rests against an abutment or nut 25. The abutment is adjustably mounted upon the rear end of the member or tie rod 16, and by it the tension of the spring B against the flange 22 may be varied. It is the function of the spring B to maintain the coupling head C at the limit of its forward movement, with said flange normally resting against the rear side of the bracket A, and to place the head under pressure when two opposing connecters come together in the act of coupling. The groove formed in the sides of the bracket A by the lugs 9 and 10 and the portions 11 and 12 may be said to constitute a seat or support for the arms or straps 21 of the body D on which seat the body may move universally, but by which the body and the coupling head C are prevented from rotating unduly about their longitudinal axis. The vertical sides of the section 13 of the bracket are preferably straight and cooperate with the inner vertical surfaces of arms 21 which are also preferably straight. This arrangement further aids to prevent rotation of the body D relative to the bracket, and at the same time the vertical arrangement of the inner surfaces of the arms 21 tend to prevent lodgment of snow and ice or other material between said arms which would interfere with the action of the device. The various parts of my improvements are, of course, so proportioned and arranged as to freely permit the movement thereof required to efficiently accommodate them to the various conditions of service, the section 13 being flared in the horizontal plane for this purpose.

In assembling my improvement the bracket A is turned until its rear face is in a plane parallel with the axis of the body D. It is then let down into the body until the aforesaid grooves formed in its sides are parallel with the arms or straps 21 of the body whereupon the bracket is turned until its rear side or face 26 is in the plane of the face of the flange 22. The universal joint, comprising members 15 and 16, is then passed through the opening 24 in the flange and assembled into the section 13 of the bracket. Thereafter the spring D is placed over the member 16 of the universal joint and is seated upon its seat 23 on the flange 22. The abutment or nut 25 is then placed in position on the member 26 whereupon the spring B may, either through the medium of the abutment 25 or the nut 17, be put under the tension required to suitably support said head and maintain it at the limit of its forward movement with the flange 22 pressing against the rear face 26 of the bracket A. Any suitable form of connection may be used to connect the train pipe of a car to the conduit 18 of my improvement. I have indicated in dotted lines at 27 a satisfactory form of such connection, which consists of the standard rubber hose now universally used on railway cars with the present hand system of connection. A gasket 28 of any desired construction is mounted in the perforation 29 of the coupling head and has communication with the conduit 18. To remove this gasket from the connecter head while the cars remain coupled I provide the member 16 at its rear end with a long thread as shown, and the abutment 25 an extended shank 30 threadingly connected therewith. With a construction of this character a defective gasket may, in the manner described in my Patent Number 1,245,789 for improvements in automatic train pipe connecters, be removed from coupled connecter heads and renewal made, while the cars remain coupled.

Being aware that changes may be made within the spirit and scope of my invention I desire not to be limited to the exact construction disclosed.

What I claim as new and desire to secure by Letters Patent of the United States is:

1. In an automatic train pipe connecter, the combination of a coupling head, a bracket for supporting said head from the coupler of a car, a universal joint for permitting universal movement of said head relative to said bracket, a spring for extending and placing the head under pressure, and a manually operated means movable independently of said spring arranged in front of said bracket and shifting said universal joint axially of said bracket and for varying the tension of said spring.

2. In an automatic train pipe connecter, the combination of a coupling head, a bracket for supporting said head from the coupler of a car, spaced means connected with said head and extending rearwardly to said bracket, a joint for permitting universal movement of said head relative to said bracket, said joint being positioned between said spaced means and comprising a pair of connected eye bolts one of which is fixed against universal movement relative to said bracket and the other of which is adapted to move universally relative to said bracket, a spring supported by said last mentioned eye-bolt for extending and placing said head under pressure, and means for preventing undue rotation of said first named eye bolt about its longitudinal axis.

3. In an automatic train pipe connecter, in combination, a car coupler, a bracket rigidly secured thereto and having a portion provided with substantially straight vertically arranged sides, a coupling head, a member rigidly secured thereto and extending rearwardly past said bracket and having universal movement relative to said bracket, said member comprising two spaced arms which span said bracket, said arms having substantially straight vertically arranged inner surfaces adapted to cooperate with the straight sides of the aforenamed portion of the bracket, said bracket also having on one side a part projecting laterally beyond the straight side of said portion, and means for yieldingly engaging said member and supporting the same on said bracket.

4. In an automatic train pipe connecter, a car coupler, a bracket rigidly secured thereto and having adjacent its lower end a notch or recess on each side, a coupling head, a member secured thereto and extending rearwardly and having spaced arms which are arranged in said notches or recesses of the bracket, whereby undue rotation of said head on a longitudinal axis is prevented, a flange or projection secured to the rear ends of said spaced arms for contacting with the rear face of the bracket, and means for yieldingly holding said projection against the bracket, said means including a spring arranged to bear against said flange, and a support for said spring pivotally connected to said bracket and partially spanned by said arms.

5. In an automatic train pipe connected, in combination, a car coupler, a bracket rigidly secured thereto and having a portion provided with substantially straight vertically arranged sides, a coupling head, a member rigidly secured thereto and extending rearwardly past said bracket and having universal movement relative to said bracket, said member comprising two spaced arms which span said bracket, said arms having substantially straight vertically arranged inner surfaces adapted to cooperate with the straight sides of the aforenamed portion of the bracket, said bracket also having on each side a part projecting laterally beyond the corresponding straight side of said portion, a tie rod pivotally engaging said bracket and extending rearwardly thereof, and a spring supported by said rod and engaging said member.

6. In an automatic train pipe connecter, a bracket having adjacent its lower end an open substantially rectangular notch or recess at each edge, the inner wall of each of said recesses being arranged substantially vertically and the top and bottom walls thereof being arranged substantially horizontally, a coupling head, a pair of spaced members rigidly secured to said head and extending rearwardly thereof on opposite sides of said bracket and having universal movement relative to said bracket, said members being spaced a distance less than the width of said bracket and being arranged in said recesses, said members being provided with top and bottom edges adapted to engage the top or bottom walls of said recesses to maintain said coupling head in proper position relative to said bracket, a flange secured to said spaced members for contacting with the rear face of the bracket, a device rigidly secured to said bracket between said spaced members, a tie rod pivotally connected to said device and extending rearwardly of the bracket and a coiled spring carried by said rod and engaging said flange.

7. In an automatic train pipe connecter, a bracket having adjacent its lower end an open notch or recess on each edge, a device adjustably mounted in said bracket between said notches, a coupling head, a pair of spaced members rigidly secured to said head and extending rearwardly on opposite sides of said bracket and having universal movement relative to said bracket, said members being arranged in said notches, a perforated flange secured to said members for contacting with the rear face of said bracket, a tie rod pivotally engaging said device and extending rearwardy through said perforated flange and a coiled spring surrounding said tie rod and bearing against said flange for holding the same in engagement with the bracket.

8. In an automatic train pipe connecter, a bracket having adjacent its lower end an open recess on each edge thereof, a coupling head, a pair of spaced members rigidly secured to said head and extending rearwardly on opposite sides of said bracket and having universal movement relative to said bracket, said members being arranged within said recesses, the portions of said bracket above and below said recesses extending laterally beyond said spaced members, a flange secured to said spaced members for bearing against the rear face of the bracket, a part rigidly secured to said bracket between said spaced members, a tie rod pivotally connected to said part and extending rearwardly of said bracket and a coiled spring surrounding said tie rod and engaging said flange.

9. In an automatic train pipe connecter, in combination, a car coupler, a bracket rigidly secured thereto and having at its lower end substantially straight vertically arranged sides, a trunnion between said straight sides, a coupling head, a member rigidly secured to the head and extending rearwardly past said bracket and having universal movement relative to the bracket, said member comprising spaced straps which span said trunnion, said straps having substantially straight vertically arranged surfaces adjacent the aforenamed straight sides of said bracket and adapted to cooperate therewith, said bracket also having on opposite sides of said trunnion a portion which projects laterally away from said straight sides and forms a support on which said member rests, a tie rod pivotally embracing said trunnion and extending rearwardly of said bracket, and a spring surrounding said tie rod and engaging said member.

10. In an automatic train pipe connecter, a coupling head, a yoke secured thereto and extending rearwardly thereof, said yoke having two spaced members having vertically arranged straight inner surfaces, a bracket extending downwardly between said members, said bracket having a portion adjacent its lower end provided with vertically arranged straight edges adapted to cooperate with the straight inner surfaces of said members to prevent rotation of said yoke about its longitudinal axis, said yoke having on its rear end a projection adapted to engage the rear side of the bracket, a tie rod pivotally connected to said bracket and extending rearwardly thereof, and a spring surrounding said rod and engaging said projection.

11. In an automatic train pipe connecter, a bracket, a coupling head, a yoke for supporting said head in front of said bracket, said yoke including spaced members secured to said head and extending rearwardly thereof, said bracket having a portion which is spanned by said spaced members, said bracket also having projections rigid therewith and extending laterally beyond the side edges of said portion and arranged to contact with said spaced members and prevent undue movement of the same in vertical planes, and means yieldingly holding said yoke projected in front of said bracket.

12. In an automatic train pipe connecter, a bracket, a coupling head, a yoke for supporting said head in front of said bracket, said yoke including spaced members secured to said head and extending rearwardly thereof, said bracket having a portion which is spanned by said members, said bracket also having on each side a projection rigid therewith and extending laterally beyond the edges of said portion, said yoke having a flanged portion adapted to bear against the rear side of said bracket, and means mounted at the rear of said bracket and yieldingly engaging said flanged portion of the yoke for holding the yoke and head projected in front of said bracket.

13. In an automatic train pipe connecter, a bracket, a coupling head, a yoke for supporting said head in front of said bracket, said yoke including spaced members secured to said head and extending rearwardly thereof, said bracket having a portion which is spanned by said members, said bracket also having on each side a projection rigid therewith and extending laterally beyond the edges of said portion and serving to prevent undue downward movement of said members relative to the bracket, a tie rod pivotally connected to said bracket and extending rearwardly thereof, and a spring carried by said tie rod and engaging the rear end of said yoke.

14. In an automatic train pipe connecter, a car coupler, a bracket rigidly secured thereto and extending downwardly therefrom, a coupling head, a yoke for supporting said head in front of said bracket, said yoke including spaced members secured to said head and extending rearwardly thereof, said bracket having a portion which is spanned by said spaced members, the width of said portion being less than the distance between said spaced members, said bracket also having a projection rigid therewith and extending laterally beyond one edge of said portion thereof and serving to prevent undue downward movement of said yoke relative to the bracket, and means for yieldingly holding said yoke and head projected in front of said bracket, said means including a coiled compression spring placed at the rear of said bracket and serving to project said yoke and said head forwardly relative to the bracket, and a tie rod extending through said spring and pivotally anchored to said bracket for securing the spring in place under compression.

15. In an automatic train pipe connecter, a bracket, a coupling head, a yoke for supporting said head in front of said bracket, said yoke including spaced members secured to said head and extending rearwardly thereof, said bracket having a portion which is spanned by said members, said bracket also having a pair of projections extending laterally away from and beyond each side of said portion of the bracket at points adjacent to said portion, said projections being arranged above and below said spaced members in position to contact therewith and constituting the sole means for preventing undue vertical movement of said yoke relative to the bracket and also acting to prevent undue rotary movement of the yoke on its longitudinal axis, said yoke having a part which engages the rear side of said bracket to limit the forward movement of the yoke and said head relative to the bracket, and means for yieldingly supporting said yoke and said coupling head, said means including a coiled compression spring arranged to press said part against the bracket, and a tie rod for securing said spring in place at the rear of said bracket.

16. A bracket for a train pipe connecter support adapted for connection to a fixed car member and carrying a block at its lower end which is apertured longitudinally of the car, in combination with laterally extending rigid guides.

In testimony whereof I hereby affix my signature.

JOSEPH V. ROBINSON.